US010809809B2

(12) United States Patent
Armendariz (10) Patent No.: US 10,809,809 B2
(45) Date of Patent: Oct. 20, 2020

(54) RECESSED KEYCAPS

(71) Applicant: HEWLETT-PACKARD DEVELOPMENT COMPANY, L.P., Houston, TX (US)

(72) Inventor: Luis C Armendariz, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 36 days.

(21) Appl. No.: 16/091,012

(22) PCT Filed: Jun. 14, 2016

(86) PCT No.: PCT/US2016/037390
§ 371 (c)(1),
(2) Date: Oct. 3, 2018

(87) PCT Pub. No.: WO2017/217974
PCT Pub. Date: Dec. 21, 2017

(65) Prior Publication Data
US 2019/0113983 A1 Apr. 18, 2019

(51) Int. Cl.
*G06F 3/02* (2006.01)
*H01H 13/705* (2006.01)
*H01H 13/86* (2006.01)

(52) U.S. Cl.
CPC ......... *G06F 3/0202* (2013.01); *H01H 13/705* (2013.01); *H01H 13/86* (2013.01); *H01H 2211/004* (2013.01); *H01H 2221/058* (2013.01); *H01H 2223/03* (2013.01); *H01H 2227/036* (2013.01)

(58) Field of Classification Search
CPC .... G06F 3/0202; H01H 13/86; H01H 13/705; H01H 2211/004; H01H 2223/03; H01H 2221/058; H01H 2227/036
See application file for complete search history.

(56) References Cited

U.S. PATENT DOCUMENTS

| 4,408,252 | A | 10/1983 | Voge et al. |
| 5,421,659 | A * | 6/1995 | Liang ........................ B41J 5/10 200/306 |
| 5,642,950 | A * | 7/1997 | Hochgesang .............. B41J 5/10 200/302.2 |
| 6,443,644 | B1 * | 9/2002 | Takeda .................. G06F 3/0202 200/302.1 |
| 7,157,651 | B2 * | 1/2007 | Rix ....................... G06F 3/0202 200/341 |

(Continued)

FOREIGN PATENT DOCUMENTS

| EP | 1206786 A1 | 5/2002 |
| JP | 3167038 U | 3/2011 |

(Continued)

*Primary Examiner* — Amy Onyekaba
(74) *Attorney, Agent, or Firm* — Brooks, Cameron & Huebsch, PLLC (57) ABSTRACT

Example implementations relate to recessed keycaps. In an example, a recessed keycap includes a keyboard frame including recesses that extend at least partially through respective internal faces of the keyboard frame and a keycap including protrusions, where each protrusion of the protrusions is disposed at least partially within and in contact with a respective recess of the recesses to movably couple the keycap to the keyboard frame.

13 Claims, 4 Drawing Sheets

(56) References Cited

U.S. PATENT DOCUMENTS

| | | | |
|---|---|---|---|
| 10,310,167 B2* | 6/2019 | Cao | H01H 13/7065 |
| 2006/0165465 A1 | 7/2006 | Wu | |
| 2007/0147934 A1* | 6/2007 | Purcocks | G06F 3/0202 |
| | | | 400/490 |
| 2007/0199804 A1* | 8/2007 | Joseph | H01H 13/705 |
| | | | 200/5 A |
| 2008/0131184 A1 | 6/2008 | Brown et al. | |
| 2010/0307902 A1* | 12/2010 | Chen | H01H 3/125 |
| | | | 200/344 |
| 2011/0220479 A1* | 9/2011 | Zhou | H01H 13/7057 |
| | | | 200/5 A |
| 2012/0160652 A1 | 6/2012 | Chao et al. | |
| 2013/0062177 A1* | 3/2013 | Shih | G06F 3/0202 |
| | | | 200/5 A |
| 2013/0098743 A1* | 4/2013 | Kuo | G06F 3/0221 |
| | | | 200/5 A |
| 2013/0162450 A1* | 6/2013 | Leong | H01H 13/703 |
| | | | 341/20 |
| 2015/0179358 A1* | 6/2015 | Nakatani | H01H 3/12 |
| | | | 200/5 A |
| 2016/0049266 A1* | 2/2016 | Stringer | H01H 13/7065 |
| | | | 200/5 A |
| 2016/0189891 A1* | 6/2016 | Zercoe | H01H 13/023 |
| | | | 200/5 A |
| 2016/0225554 A1* | 8/2016 | Koike | H01H 3/125 |
| 2017/0358406 A1* | 12/2017 | Yang | G06F 1/1666 |
| 2018/0068811 A1* | 3/2018 | Ligtenberg | H01H 13/705 |

FOREIGN PATENT DOCUMENTS

| | | |
|---|---|---|
| JP | 2013058183 A | 3/2013 |
| JP | 2013089240 A | 5/2013 |
| JP | 2016081393 A | 5/2016 |
| KR | 20-2011-0008859 U | 9/2011 |

* cited by examiner

RECESSED KEYCAPS

BACKGROUND

Keyboards are utilized in a variety of applications. For example, keyboards may be utilized as an input device to provide letters, numbers and/or characters to a computer, among other possibilities. Ensuring that a keyboard operates as intended may be desirable.

DETAILED DESCRIPTION

During an operational lifetime a keyboard may be subjected to environmental conditions such as humidity and/or liquid (e.g., liquids spilled on a surface of the keyboard), among other environmental conditions, that may cause the keyboard to experience temporary and/or permanent damage. As a result, the keyboard may not function as intended. For example, a particular key (e.g., a spacebar) on the keyboard may not produce a desired output (e.g., a space). As such, ensuring that a keyboard operates as intended may be desirable.

Some types of keyboards may include keys having scissor mechanisms. These scissor mechanisms may interlock a keycap of the key to another portion of the key. The scissor mechanisms may permit a desired travel time and/or travel distance of the key when pressed by a user. However, such scissor mechanisms increase manufacturing costs and a number of parts (e.g., movable parts) included in the key. The increased number of parts may increase a likelihood of the key malfunctioning, such as the key becoming jammed. Moreover, attachment points of the keycap due to the scissor mechanisms may cause more debris to become lodged under the key. The scissor mechanism may be positioned in openings in a keyboard membrane. Such opening can provide potential avenues for liquids to reach various components of the key and therefore increase likelihood of the key malfunctioning. Nonetheless, removal of the scissor mechanism may cause the key to become unstable such as to wobble, jiggle or descend at angle, when pressed by the user.

Examples of the disclosure include recessed keycaps, keyboard membranes including recessed keycaps, and methods of manufacture of recessed keycaps. Notably, the recessed keycaps and keyboard membranes including recessed keycaps have less parts than those employing scissor mechanisms while still maintaining a desired stability and performance (e.g., a desired force to fire) of keys of the keyboard membrane.

As used herein, a recessed keycap refers to a keycap positioned in and in contact with a recess in an internal face of a keyboard frame. Notably, recessed keycaps, in various examples, do not include scissor mechanisms. Further, due at least in part to the absence of scissor mechanisms and openings related thereto, the keyboard membranes including recessed keycaps having less openings and therefore a decreased likelihood of malfunctioning. Keyboard membranes as used herein refer to those membranes suitable in and/or as a keyboard.

Figure 1:
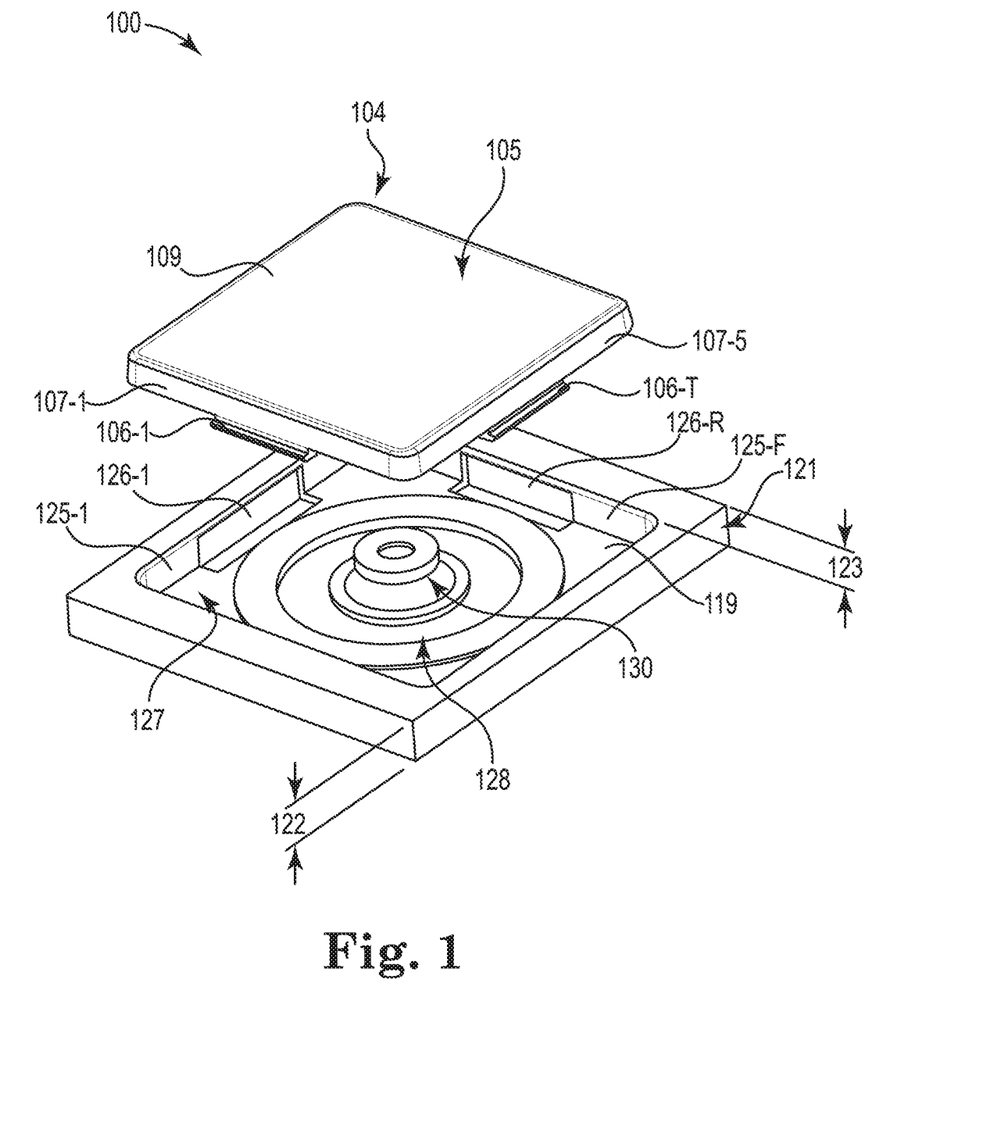
FIG. 1 illustrates an exploded view of an example of a recessed keycap according to the disclosure.

FIG. 1 illustrates a view of an example of a recessed keycap 100 according to the disclosure. The recessed keycap 100 can include a keycap 104 and a keyboard frame 121.

The keycap 104 can include a body 105 and protrusions 106-1, 106-2, 106-3, . . . , 106-T (106-1 and 106-T illustrated in FIG. 1). The body 105 can be formed of plastic, metal, or combinations thereof. The body 105 has faces 107-1, 107-2, 107-3, . . . , 107-S (107-1 and 107-S illustrated in FIG. 1). The faces 107-1, . . . , 107-S (i.e., surfaces) are disposed between a top face 109 and a bottom face (not shown for ease of illustration) of the keycap 104. For example, the keycap 104 includes a total of four faces 107-1, . . . , 107-S. However, a total number of the faces 107-1, . . . , 107-S can be varied to include fewer or more faces. The keycap 104, while illustrated in FIG. 1 as being substantially a square shape can be various shapes such as circles, rectangles, etc. depending upon a desired application.

The body 105 can be in contact with and/or to contact a dome 130. The dome 130 can be formed of a resilient material, such as rubber, among other possibilities.

The protrusions 106-1, . . . , 106-T can be formed of plastic, metal, or combinations thereof. In various examples, the protrusions 106-1, . . . , 106-T can be integral with the body 105 of the keycap 104 and formed of a same material (e.g., plastic) as the body 105 of the keycap 104.

The protrusions 106-1, . . . , 106-T are sized to be disposed at least partially within and in contact with a recess, as described herein. In various examples, the protrusions 106-1, . . . , 106-T can be tabs such as those as illustrated in FIG. 1. A tab can be integral with and/or attached to the body 105. In various examples, each protrusion of the protrusions 106-1, . . . , 106-T is formed of a tab integral with the body 105 of the keycap 104.

As illustrated in FIG. 1, the protrusions 106-1, . . . , 106-T can be formed of four tabs where a respective tab is positioned on each face of the faces 107-1, . . . , 107-S. However, the disclosure is not so limited. Rather, a total number of protrusions, a type of protrusion, a size of the protrusion, a position of a protrusion along a face of the keycap 104 or otherwise on the keycap 104, among other items can be varied depending upon a desired application.

In some examples some but not all faces of a keycap include a protrusion. For instance, three of four faces of the keycap can include protrusions, while the fourth face is without a protrusion. In various example, a respective face of a keycap can include a plurality of protrusions, as described herein with respect to FIG. 2.

The keyboard frame 121 can include recesses 126-1, 126-2, 126-3, . . . , 126-R (126-1 and 126-R illustrated in FIG. 1) that extend at least partially through respective internal faces 125-1, 125-2, 125-3, . . . , 125-F (125-1 and 125-F illustrated in FIG. 1) of the keyboard frame 121. For example, the keyboard frame 121 can include a total of four internal faces 125-1, . . . , 125-F. However, a total number of the faces 125-1, . . . , 125-F can be varied to include fewer or more faces. Regardless of a total number of the faces 125-1, . . . , 125-F, the faces 125-1, . . . , 125-F together define a cavity 127 of the keyboard frame 121 within which at least a portion of the keycap 104 can be disposed, as described herein.

Each recess of the recesses 126-1, . . . , 126-R passes at least partially through an internal side face (e.g., internal side face 125-1), an internal bottom face 119, or a combination thereof. For example, as illustrated in FIG. 1, each recess (e.g., recess 126-R) of the recesses 126-1, . . . , 126-R recesses can pass through a portion of but not all of a width 123 of a respective internal side surface (e.g., internal side surface 125-F) of the keyboard frame 121, while each recess (e.g., recess 126-R) of the recesses 126-1, . . . , 126-R recesses can pass entirely through a height 122 the bottom internal face 119 of the keyboard frame 121.

As used herein, a keycap (e.g., keycap 104) being movably coupled to a keyboard frame refers to the recesses (e.g., recesses 126-1, . . . , 126-R) permitting the keycap to travel along a desired path of travel (e.g., along a substantially vertical path of travel in the same plane as the height 122 of the keyboard frame 121). For instance, each recess of the recesses 126-1, . . . , 126-R has a respective height (e.g., 1.2 millimeters along the same plane as the height 122 of the keyboard frame 121) greater than a respective height of each of the protrusions (e.g., 0.3 millimeters along the same plane as the height 122 of the keyboard frame 121) to permit vertical travel (e.g., along the same plane as the height 122 of the keyboard frame 121) of the protrusions within the recesses 126-1, . . . , 126-R. In various examples, each recess of the recesses 126-1, . . . , 126-R can have the same respective height (e.g., 1.2 millimeters), while each protrusion of the protrusions 106-1, . . . , 106-T can have the same respective height (e.g., 0.3 millimeters). Notably, in various examples the keycap 104 is movably coupled to the keyboard frame 121 without intervening elements such as scissor mechanism, adhesive, etc.

In various examples, a total number of the recesses 126-1, . . . , 126-R is equal to a total number of the protrusions 106-1, . . . , 106-T. For example, as illustrated in FIG. 1, the recessed keycap 100 can include four protrusions 106-1, . . . , 106-T and four recesses 126-1, . . . , 126-R.

Figure 2:
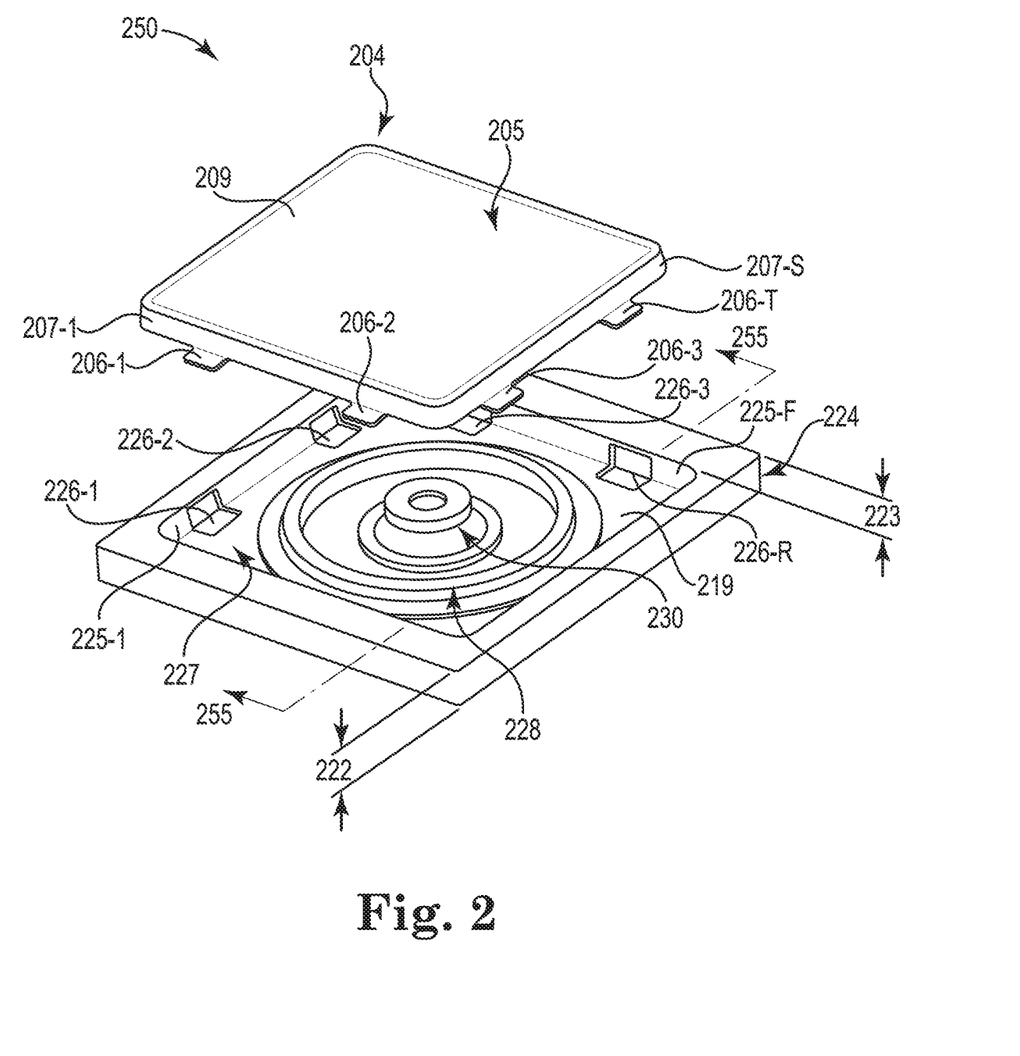
FIG. 2 illustrates an exploded view of an example of a recessed keycap according to the disclosure.

FIG. 2 illustrates an exploded view of an example of a recessed keycap 250 according to the disclosure. As illustrated in FIG. 2, the recessed keycap 250 can include a keycap 204, a keyboard frame 224, and a keycap guide 228.

Similar to FIG. 1, the keycap 204 can include a body 205 and protrusions 206-1, 206-2, 206-3, 206-4, 206-5, 206-6, 206-7, . . . , 206-T (206-1, 206-2, 206-3, and 206-T illustrated in FIG. 2). The body 205 has faces 207-1, 207-2, 207-3, . . . , 207-S (207-1 and 207-S illustrated in FIG. 2) disposed between a top face 209 and a bottom face (not shown for ease of illustration) of the keycap 204. The body 205 can contact a dome 230.

As mentioned, the protrusions 206-1, . . . , 206-T can be integral with the body 205 of the keycap 204 and formed of a same material (e.g., plastic) as the body 205 of the keycap 204. In various examples, the protrusions 206-1, . . . , 206-T can be tabs. In various examples and as illustrated in FIG. 2, the protrusions 206-1, . . . , 206-T can be formed of eight tabs where two tabs are positioned on each face of the faces 207-1, . . . , 207-S of the body 205. However, as mentioned, a total number of protrusions, a type of protrusion, a size of the protrusion, a position of a protrusion along a face of the keycap 204 or otherwise on the keycap 204, among other items can be varied depending upon a desired application to promote recessed keycaps.

The keyboard frame 224 can include recesses 226-1, 226-2, 226-3, 2264, 226-5, 226-6, 226-7, . . . , 226-R (226-1, 226-2, 226-3 and 226-R illustrated in FIG. 2) that extend at least partially through respective internal faces 207-1, . . . , 207-S of the keyboard frame 224. For example, the keycap 204 includes a total of four faces 207-1, 207-2, 207-3, . . . , 207-S (207-1 and 207-S illustrated in FIG. 2). The faces 207-1, . . . , 207-S of the keyboard frame 224 together define a cavity 227 in the keyboard frame 224 within which at least a portion of the keycap 204 is disposed, as described herein.

Each recess of the recesses 226-1, . . . , 226-R passes at least partially through an internal side face (e.g., internal side face 225-1), an internal bottom face 219, or a combination thereof. For example, as illustrated in FIG. 2, each recess (e.g., recess 226-R) of the recesses 226-1, . . . , 226-R recesses can pass through a portion of but not all of a width 223 of a respective internal side surface (e.g., internal side surface 225-F) of the keyboard frame 223, while each recess (e.g., recess 226-R) of the recesses 226-1, . . . , 226-R recesses can pass entirely through a height 222 of the bottom internal face 219 of the keyboard frame 223. As mentioned, the keycap 204 can be movably coupled to the keyboard frame 223.

The keycap guide 228 can to guide the keycap by contacting the keycap 204. That is, the keycap guide 228 can be in contact with or positioned to contact the keycap 204, as described herein in greater detail with respect to FIG. 3.

The keycap guide 228 can be integral with and/or attached to the keyboard frame 223. For example, the keycap guide 228 can, in some examples, be formed of a projection integral with and extending from the keyboard frame 223. For instance, the keycap guide 228 can be formed of a projection that extends from the keyboard frame 224 to a height that is equal to at least a portion of a path of travel of the keycap 204, as described in greater detail with respect to FIG. 3.

In some examples, the keycap guide 228 can be formed of a continuous circular projection extending from the keyboard frame 223, as illustrated in FIG. 2. However, the disclosure is not so limited. Rather, the keycap guide can be a continuous and/or discontinuous and include a different total number of projections (e.g., two projections) to promote aspects of recessed keycaps, as described herein.

Figure 3:
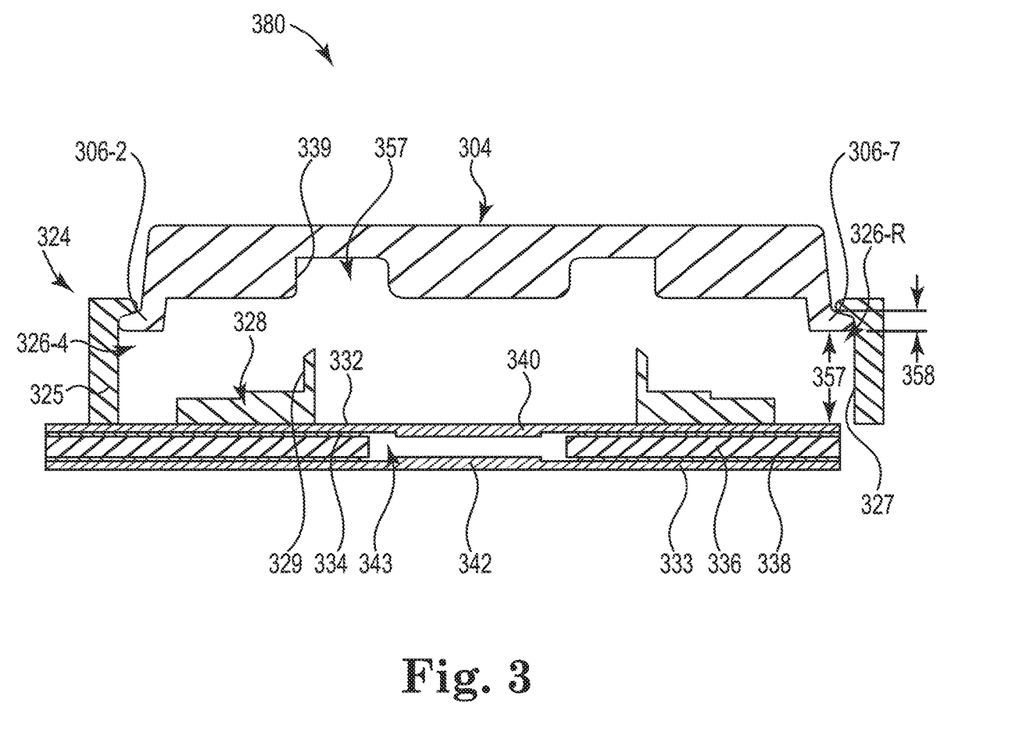
FIG. 3 illustrates a section view of an example of a keyboard membrane including the recessed keycap of FIG. 2 according to the disclosure.

FIG. 3 illustrates a section view (taken along cross-section 255 of FIG. 2) of an example of a keyboard membrane 380 including a recessed keycap according to the disclosure. The keyboard membrane 380 includes a recessed keycap (formed of keycap 304 and frame 324), a keycap guide 328, a first circuit 332, a second circuit 333, a first adhesive layer 334, a second adhesive layer 338, and a spacer 336. However, while FIG. 3 illustrates the keyboard membrane 380 as including a particular number of elements, the disclosure is not so limited. Elements shown in the various figures herein can be added, exchanged, and/or eliminated so as to promote various aspects of recessed keycaps according to the disclosure. For example, while FIG. 3 illustrates the keyboard membrane as including the keycap guide 328, in some examples, the keycap guide 328 can be removed from and/or not included in the frame 324 such that the keyboard membrane 380 does not include a keycap guide. Notably, the keyboard membrane 380 does not include scissor mechanisms or corresponding openings related thereto.

The keycap 304 can include an indentation 337 to receive at least a portion of the key guide 328. The indentation 337 can include a surface 339 that is in contact with or is to contact a corresponding surface (e.g., surface 329) of the keyboard frame 323.

The keycap 304, as illustrated in FIG. 3, includes protrusions 306-2, 306-7 disposed at least partially within and in contact with a respective recess (e.g., 306-7 disposed partially within and in contact with a surface 372 of recess 326-R) of the recesses to movably couple the keycap 304 to the keyboard frame 324. As mentioned, in some examples, each recess of the recesses can have a respective height (e.g., a height equal to a distance of the path of travel 357) greater than a respective height (e.g., height 358) of each of the protrusions to permit movement of the protrusions within the recesses.

The protrusions can contact at least one surface of a recess to movably couple the keycap 304 to the keyboard frame. In various examples, the protrusions can contact at least two surfaces such as a surface positioned substantially orthogonal to the path of travel (i.e., a top surface and/or a bottom surface of the keyboard frame) and/or a surface positioned substantially planar to the path of travel 357 (i.e., a side surface of the keyboard frame), as shown in FIG. 3.

As illustrated in FIG. 3, the keycap guide 328 can be formed of a projection integral with and extending from the keyboard frame 324. The projection can extend from the keyboard frame 324 in a substantially vertical plane (e.g., in the same plane as the path of travel 357). For instance, the keycap guide 328 can be formed of a projection that extends from the keyboard frame 324 to a height that is equal to at least a portion of a path of travel 357 of the keycap 304. In this manner, the keycap guide 328 can to guide the keycap 304 by contacting the indentation 337 of the keycap 304, among other possibilities. That is, the keycap guide 328 can be in contact with or positioned to contact (e.g., to contact the surface 339) the keycap 304, as described herein in greater detail with respect to FIG. 3. Stated differently, a height of the keycap guide can be varied depending, for example, upon whether contact with the keycap 304 through some or all of the path of travel 357 of the keycap is desired.

The first circuit 332 can include a first conductive trace (not shown for ease of illustration) and a first key contact 340. The first conductive trace is coupled to the first key contact 340. The second circuit 333 can include a second conductive trace (not shown for ease of illustration) and a second key contact 342. The second conductive trace is coupled to the second key contact 342. The conductive traces, in some examples, are silver conductive traces. However, the disclosure is not so limited. Rather, the conductive traces can be formed of a variety of suitable materials including silver and carbon and/or combinations thereof, among other types of suitable materials.

The second key contact 342 is to contact the first key contact 340, for example, when the first key contact 340 of the first circuit 332 is displaced by a displacement force applied to the keycap, among other possibilities to contact the first key contact 340 and the second key contact 342. For instance, the first key contact 340 may be displaced along a path of travel 357 that is substantially perpendicular to the first circuit 332 and/or the second circuit 333. Contact between the first key contact 340 and the second key contact 342 can include causing the first key contact 340 to move along the path of travel 357 to be positioned adjacent to and/or substantially adjacent to the second key contact 342 to couple (e.g., electrically couple) the first key contact 340 with the second key contact 342.

The keyboard membrane 380 can include a first adhesive layer 334 disposed on at least a portion of the spacer 336. Similarly, the keyboard membrane 380 can include a second adhesive layer 338 disposed on at least a portion of the spacer 336. An adhesive included in the first adhesive layer 334 and/or the second adhesive layer 338 can be a solvent based adhesive, a pressure sensitive adhesive, a contact adhesive, a multi-part adhesive, and/or a one-part adhesive, among other types of adhesives suitable to promote recessed keycaps.

The keyboard membrane 380 can include the first adhesive layer 334, the second adhesive layer 338, and the spacer 336 such that the spacer 336 is positioned between the first circuit 332 and the second circuit 333, as illustrated in FIG. 3. For example, as, as illustrated in FIG. 3, the spacer 336 can be positioned between the first adhesive layer 334 and the second adhesive layer 338 such that each are positioned between the first circuit 332 and the second circuit 333. However, in some examples the keyboard membrane 380 can be formed without a spacer.

The spacer 336 can be formed of plastic such as polyethylene terephthalate, among other materials and/or combinations of materials. The spacer 336 can promote various performance characteristics, for example, disposition of the first circuit 332 and the second circuit 333 to have a desired force to fire (i.e., an amount of force applied to the keycap 304 of the keyboard membrane 380 sufficient to complete a switch formed between the first key contract 340 and the second key contract 342. The spacer 336 can form a portion of a distance separating the first circuit 332 from the second circuit 333.

The keyboard membrane 380 includes an opening 343 to permit the first key contact 340 to contact the second key contact 342. For example, the opening 343 can extend from the first key contact 340 of the first circuit 332 to the second key contact 342 of the second circuit 333 through each of the first adhesive layer 334 and the second adhesive layer 338, and the spacer 336, as illustrated in FIG. 3. Notably, at least of portion of the opening 343 extends from the first key contact 340 to the second key contact 342.

Electrical bridges can provide power to the first circuit 332 and/or the second circuit 333. Electrical bridges can couple a portion of the keyboard membrane 380 to another portion of the keyboard membrane 380. For instance, electrical bridges can couple the recessed keycap 350 to another portion of the keyboard membrane including another recessed keycap (not shown).

Figure 4:
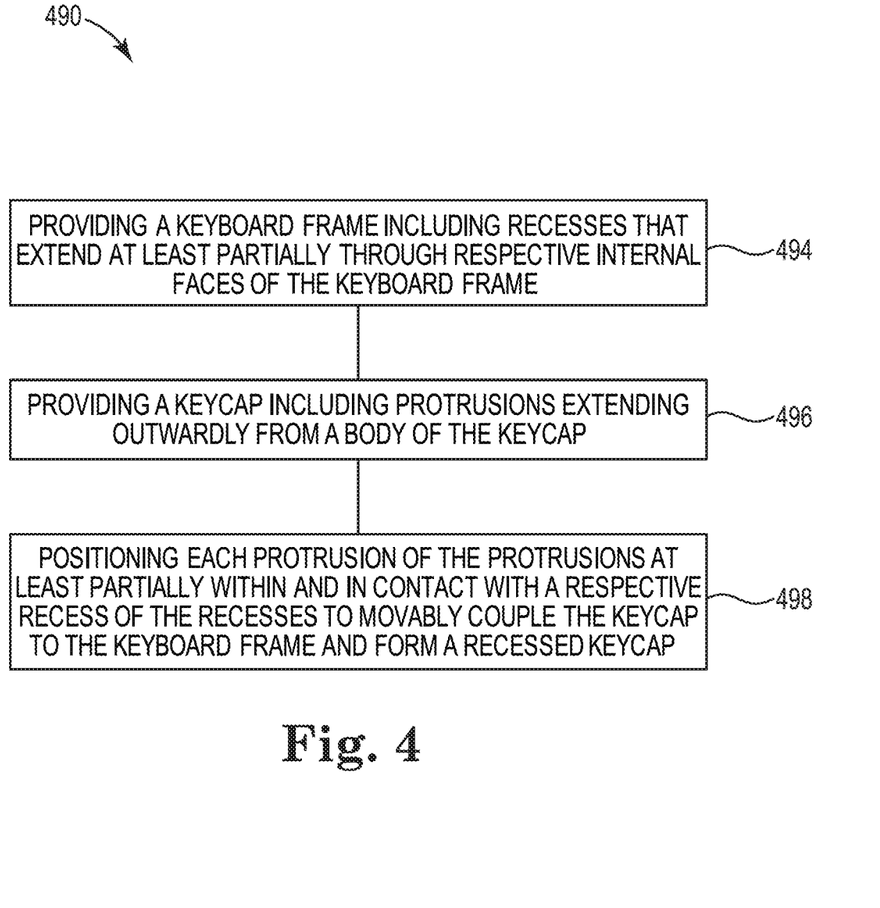
FIG. 4 illustrates a flow diagram of an example of a method of manufacture of a recessed keycap according to the disclosure.

FIG. 4 illustrates a flow diagram of an example of a method of manufacture of a recessed keycap according to the disclosure. As illustrated at 494, the method 490 can include providing a keyboard frame including recesses that extend at least partially through respective internal faces of the keyboard frame. Similarly, the method 490 can include providing a keycap including protrusions extending outwardly from a body of the keycap, as illustrated at 496. Extending outwardly refers to extending from a face of the keycap (e.g., in at least a direction perpendicular to an intended vertical direction of travel to the keycap). Providing can include manufacture of and/or otherwise procuring the keyboard frame and the keycap.

As illustrated at 498, the method 490 can include disposing each protrusion of the protrusions at least partially within and in contact with a respective recess of the recesses to movably couple the keycap to the keyboard frame and form a recessed keycap. Disposing refers to directly or indirectly causing each protrusion of the protrusions at least partially within and in contact with a respective recess of the recesses. For example, directly and/or indirectly causing impartation of a force on the keycap and/or the keyboard frame can then cause each protrusion of the protrusions to be disposed at least partially within and in contact with a respective recess of the recesses. In this manner, the keycap can be movably coupled to (able to move along a path of travel) and yet nonremovably coupled to the keyboard frame due to contact between the protrusions being at least partially within and in contact with the respective recesses of the keyboard frame. For instance, the keycap can be movably and nonremovably coupled to the keyboard to provide a functional keycap for an end-user and yet prevent manual force (e.g., when the keycap is pressed by a user) from removal of the keycap from the recesses of the keyboard frame.

In some examples, the method 490 can include providing a stabilizing wire and coupling the stabilizing wire to the keycap. Such a stabilizing wire can be used for some or all keycaps of a keyboard membrane depending upon an application. For example, a stabilizing wire can be coupled to at least the relatively large keycaps such as a spacebar, a tab, etc. of a keyboard while relatively small keycaps such as those corresponding to a letter key (e.g., the letter "a") may be without a stabilizing wire. It is noted that the recessed keycaps, as described herein, readily permit coupling to a stabilizing wire whereas keycaps of some other approaches such as those employing scissor mechanisms may not readily permit coupling a stabilizing wire to such keys and/or keycaps.

It will be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

In the foregoing detailed description of the disclosure, reference is made to the accompanying drawings that form a part hereof, and in which is shown by way of illustration how examples of the disclosure may be practiced. These examples are described in sufficient detail to enable those in the art to practice the examples of this disclosure, and it is to be understood that other examples (e.g., having different thickness) may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 104 may refer to element 104 in FIG. 1 and an analogous element may be identified by reference numeral 204 in FIG. 2. Elements shown in the various figures herein can be added, exchanged, and/or eliminated so as to provide a number of additional examples of the disclosure. The proportion and the relative scale of the elements provided in the figures are intended to illustrate the examples of the disclosure, and should not be taken in a limiting sense. As used herein, "a number of" an element and/or feature can refer to one or more of such elements and/or features. Further still, while some elements are designated as a "top face" or a "bottom face" those in the art will recognize that such elements may correspond to other relative terms or possible orientations in some applications in order to practice the examples of this disclosure

What is claimed:

1. A recessed keycap, comprising:
    a keyboard frame including recesses that extend:
        partially through respective internal side faces of the keyboard frame; and entirely through a height of a bottom internal face of the keyboard frame; and
    a keycap including protrusions, wherein each protrusion of the protrusions is disposed at least partially within and in contact with a respective recess of the recesses such that the keycap is movably coupled to the keyboard frame without intervening elements between the keycap protrusions and the respective internal side faces of the keyboard frame.

2. The recessed keycap of claim 1, wherein the keyboard frame includes a keycap guide to guide the keycap by contacting the keycap.

3. The recessed keycap of claim 1, wherein the respective internal side faces of the keyboard frame together define a cavity, and wherein at least a portion of the keycap is disposed within the cavity.

4. The recessed keycap of claim 1, wherein the respective faces of the keyboard frame together define a cavity, and wherein at least a portion of the keycap is disposed within the cavity.

5. The recessed keycap of claim 1, wherein each protrusion of the protrusions comprises a tab integral with a body of the keycap.

6. The recessed keycap of claim 1, wherein each recess of the recesses has a respective height greater than a respective height of each of the protrusions to permit movement of the protrusions within the recesses.

7. The recessed keycap of claim 1, wherein a total number of the recesses is equal to a total number of the protrusions.

8. A keyboard membrane including a recessed keycap, wherein the recessed keycap comprises:
    a keyboard frame including recesses, wherein the recesses extend:
        at least partially through respective internal side faces of the keyboard frame; and
        entirely through a height of a bottom internal face of the keyboard frame;
    a keycap having protrusions, wherein each protrusion of the protrusions is disposed at least partially within and in contact with a respective recess of the recesses such that the keycap is movably coupled to the keyboard frame without intervening elements between the keycap protrusions and the respective internal side faces of and the keyboard frame; and
    a keycap guide to guide the keycap by contacting the keycap.

9. The keyboard membrane of claim 8, wherein the keycap guide comprises a projection extending from the bottom internal face of the keyboard frame.

10. The keyboard membrane of claim 9, wherein the projection extends from the keyboard frame to a height that is equal to at least a portion of a height of the recess.

11. The keyboard membrane of claim 9, wherein the projection further comprises a continuous circular projection.

12. A method of manufacture of a recessed keycap, comprising:
    providing a keyboard frame including recesses that extend:
        at least partially through respective internal side faces of the keyboard frame; and entirely through a height of a bottom internal face of the keyboard frame;
    providing a keycap including protrusions extending outwardly from a body of the keycap; and
    positioning each protrusion of the protrusions at least partially within and in contact with a respective recess of the recesses to movably couple the keycap to the keyboard frame without intervening elements between the keycap protrusions and the respective internal side faces of the keyboard frame and form a recessed keycap.

13. The method of claim 12, including providing a stabilizing wire, and coupling the stabilizing wire to the keycap.

* * * * *